(12) United States Patent
Chen

(10) Patent No.: US 12,230,045 B2
(45) Date of Patent: Feb. 18, 2025

(54) ENGLISH CHAR IMAGE RECOGNITION METHOD

(71) Applicant: ADVANCED VIEW INC., Taipei (TW)

(72) Inventor: Chung-Hsing Chen, Taipei (TW)

(73) Assignee: ADVANCED VIEW INC., Taipei (TW)

( * ) Notice: Subject to any disclaimer, the term of this patent is extended or adjusted under 35 U.S.C. 154(b) by 413 days.

(21) Appl. No.: 17/901,538

(22) Filed: Sep. 1, 2022

(65) Prior Publication Data

US 2023/0146241 A1    May 11, 2023

(30) Foreign Application Priority Data

Oct. 7, 2021 (TW) ................... 110137294

(51) Int. Cl.
*G06V 30/19* (2022.01)
*G06T 7/12* (2017.01)
*G06T 7/66* (2017.01)
*G06T 7/73* (2017.01)
*G06V 10/82* (2022.01)

(52) U.S. Cl.
CPC ......... *G06V 30/19127* (2022.01); *G06T 7/12* (2017.01); *G06T 7/66* (2017.01); *G06T 7/73* (2017.01); *G06V 10/82* (2022.01); *G06V 30/19173* (2022.01); *G06T 2207/20021* (2013.01); *G06T 2207/20076* (2013.01); *G06T 2207/20084* (2013.01)

(58) Field of Classification Search
CPC ............ G06V 30/19127; G06V 10/82; G06V 30/19173; G06T 7/12; G06T 7/73; G06T 2207/20021; G06T 2207/20076; G06T 2207/20084

See application file for complete search history.

(56) References Cited

U.S. PATENT DOCUMENTS

2021/0390296 A1* 12/2021 En ................... G06V 30/19173

OTHER PUBLICATIONS

Wang, A. B., & Fan, K. C. (2001). Optical recognition of handwritten Chinese characters by hierarchical radical matching method. Pattern Recognition, 34(1), 15-35. (Year: 2001).*
L. Xing, Z. Tian, W. Huang and M. Scott, "Convolutional Character Networks," 2019 IEEE/CVF International Conference on Computer Vision (ICCV), Seoul, Korea (South), 2019, pp. 9125-9135, doi: 10.1109/ICCV.2019.00922. (Year: 2019).*

* cited by examiner

*Primary Examiner* — Edward F Urban
*Assistant Examiner* — Ashley L. Hytrek
(74) *Attorney, Agent, or Firm* — Ying-Ting Chen; Law Office of Michael Chen

(57) ABSTRACT

The invention provides an English char image recognition method mainly generating a rectangular coordinate frame from a loaded English character image, finding a gravity center in the rectangular coordinate frame, obtaining feature points on the rectangular coordinate frame and around the gravity center, performing one-dimensional convolutional operation and processing on the feature points to generate six layer feature maps, and generating a character recognition result from the six layer feature maps to solve the problem of generating a large amount of computation in conventional two-dimensional recognition operation, thereby achieving an efficacy of reducing recognition equipment costs and enabling fast and accurate recognition.

9 Claims, 8 Drawing Sheets

ENGLISH CHAR IMAGE RECOGNITION METHOD

BACKGROUND OF THE INVENTION

Field of Invention

The invention relates to an image recognition method, and more particularly to an English char image recognition method capable of reducing recognition equipment costs and enabling fast and accurate recognition.

Related Art

At present, in scanning after word processing, English character recognition software in the computer device needs to recognize English characters. However, most English character recognition software on the market currently use two-dimensional recognition operation. In the two-dimensional recognition operation, it requires many crossed operations to recognize the scanned English characters, and therefore will generate a large amount of computation. But the condition for completion of its two-dimensional operation is that high-end hardware and computing system are required to be able to successfully classify the English characters, and the processor needs to be equipped with high-end hardware and computing system. However, in today's business environment, not all computer devices for general word processing are equipped with high-cost hardware and computing system. Under the condition of insufficient hardware and computing system, when the computer device recognizes English characters, in addition to recognition errors, it is more likely to cause the computer device to slow down in operation or crash.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above problems, a main object of the invention is to provide an English char image recognition method capable of reducing recognition equipment costs and enabling fast and accurate recognition.

In order to achieve the above object, the invention provides an English char image recognition method at least comprising loading an English character image, generating a rectangular coordinate frame for the English character image by a processing unit; finding a gravity center of the English character image in the rectangular coordinate frame, radiating 12 straight lines in sequence from the gravity center toward a direction of the rectangular coordinate frame at an interval angle of 30°, defining a simulated distance on each of the straight lines and calculating 3 vector feature positions from the simulated distance in order to obtain 36 vector features in the rectangular coordinate frame and read a gray scale of the vector feature positions; dividing into four equal parts by 5 dividing points respectively on upper and lower edges of the rectangular coordinate frame and defining the dividing points as positions of upper and lower edge features to obtain 5 edge features respectively, dividing into five equal parts by 6 dividing points respectively on left and right edges of the rectangular coordinate frame and defining the dividing points as positions of left and right edge features to obtain 4 edge features in order to obtain 18 edge features on the rectangular coordinate frame and read a gray scale of positions of the edge features; merging 36 vector features and 18 edge features and arranging in a 1×54 array, adding a blank feature respectively at beginning and end of the 1×54 array, arranging and forming a feature map in a 1×56 array; performing 6 times of one-dimensional convolutional operation to generate 6 first array feature maps with an array of 1×54; performing a maximum pooling operation of convolutional neural network on each of the first array feature maps to generate 6 second array feature maps with an array of 1×27; performing a one-dimensional convolution operation of convolutional neural network on each of the second array feature maps to generate 16 third array feature maps with an array of 1×25; performing a full connection of convolutional neural network on the third array feature maps to form a fourth full connection layer/fourth array feature maps with an array of 1×300; performing a full connection of convolutional neural network on the fourth full connection layer/fourth array feature maps to form a fifth full connection layer/fifth array feature maps with an array of 1×150; performing a full connection of convolutional neural network on the fifth full connection layer/fifth array feature maps to form a sixth full connection layer/sixth array feature maps with an array of 1×52; and the processing unit performing probability recognition according to the sixth full connection layer/sixth array feature maps with an array of 1×52 and outputting 52 probabilities, and among the outputted 52 probabilities, outputting a class with a probability value floating point number being closer to 1 as a character recognition result.

The invention further discloses an English char image recognition method, wherein a width of the rectangular coordinate frame is divided by 2 and a height thereof is divided by 2 and a rounding process is performed, the rounding process rounds off numbers of digits after the decimal point in a calculation value, an intersecting position of the numbers after the width and height are rounded off is defined as the gravity center, the first straight line is radiated vertically from the gravity center toward an upper direction of the rectangular coordinate frame, and the 12 straight lines are obtained by radiating in sequence at an interval angle of 30° from the gravity center.

The invention further discloses an English char image recognition method, wherein if a height distance of the rectangular coordinate frame is greater than a width distance of the rectangular coordinate frame, a length of the simulated distance is a width distance of the rectangular coordinate frame, the 3 vector feature positions on each of the straight lines are respectively calculated by dividing the simulated distance from the gravity center outwardly by 2, dividing the simulated distance from the gravity center outwardly by 3, and dividing the simulated distance from the gravity center outwardly by 4, and a rounding process is performed, the rounding process rounds off numbers of digits after the decimal point in a calculation value, and positions of reserved integers are defined as the vector feature positions, conversely, if a height distance of the rectangular coordinate frame is less than a width distance of the rectangular coordinate frame, a length of the simulated distance is a height distance of the rectangular coordinate frame, the 3 vector feature positions on each of the straight lines are respectively calculated by dividing the simulated distance from the gravity center outwardly by 2, dividing the simulated distance from the gravity center outwardly by 3, and dividing the simulated distance from the gravity center outwardly by 4, and a rounding process is performed, the rounding process rounds off numbers of digits after the decimal point in a calculation value, and positions of reserved integers are defined as the vector feature positions.

The invention further discloses an English char image recognition method, wherein the processing unit uses random values and an array of 1×3 core to perform 6 times of one-dimensional convolutional operation to generate 6 first array feature maps with an array of 1×54.

The invention further discloses an English char image recognition method, wherein the processing unit uses an array of 1×2 core to perform a maximum pooling operation of convolutional neural network on the 6 first array feature maps with an array of 1×54 to generate 6 second array feature maps with an array of 1×27.

The invention further discloses an English char image recognition method, wherein the processing unit uses random values and an array of 1×3 core to perform one-dimensional convolutional operation on the 6 second array feature maps with an array of 1×27 to generate 16 third array feature maps with an array of 1×25.

The invention further discloses an English char image recognition method, wherein the processing unit flattens the 16 third array feature maps with an array of 1×25 and generates a fully connection layer with an array of 1×400, and the processing unit performs full connection of a first convolutional neural network on the fully connection layer with an array of 1×400 to generate a fourth full connection layer/fourth array feature maps with an array of 1×300.

The invention further discloses an English char image recognition method, wherein the processing unit performs full connection of a second convolutional neural network on the fourth full connection layer/fourth array feature maps with an array of 1×300 to generate a fifth full connection layer/fifth array feature maps with an array of 1×150.

The invention further discloses an English char image recognition method, wherein the processing unit performs full connection of a third convolutional neural network on the fifth full connection layer/fifth array feature maps with an array of 1×150 to generate a sixth full connection layer/sixth array feature maps with an array of 1×52, and the processing unit recognizes the sixth full connection layer/sixth array feature maps with an array of 1×52 and generates the recognition result.

DETAILED DESCRIPTION OF THE INVENTION

The above objects of the invention, as well as its structural and functional features, will be described in accordance with the preferred embodiments of the accompanying drawings.

In the following, for the formation and technical content related to an English char image recognition method of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numerals.

Figure 1A:
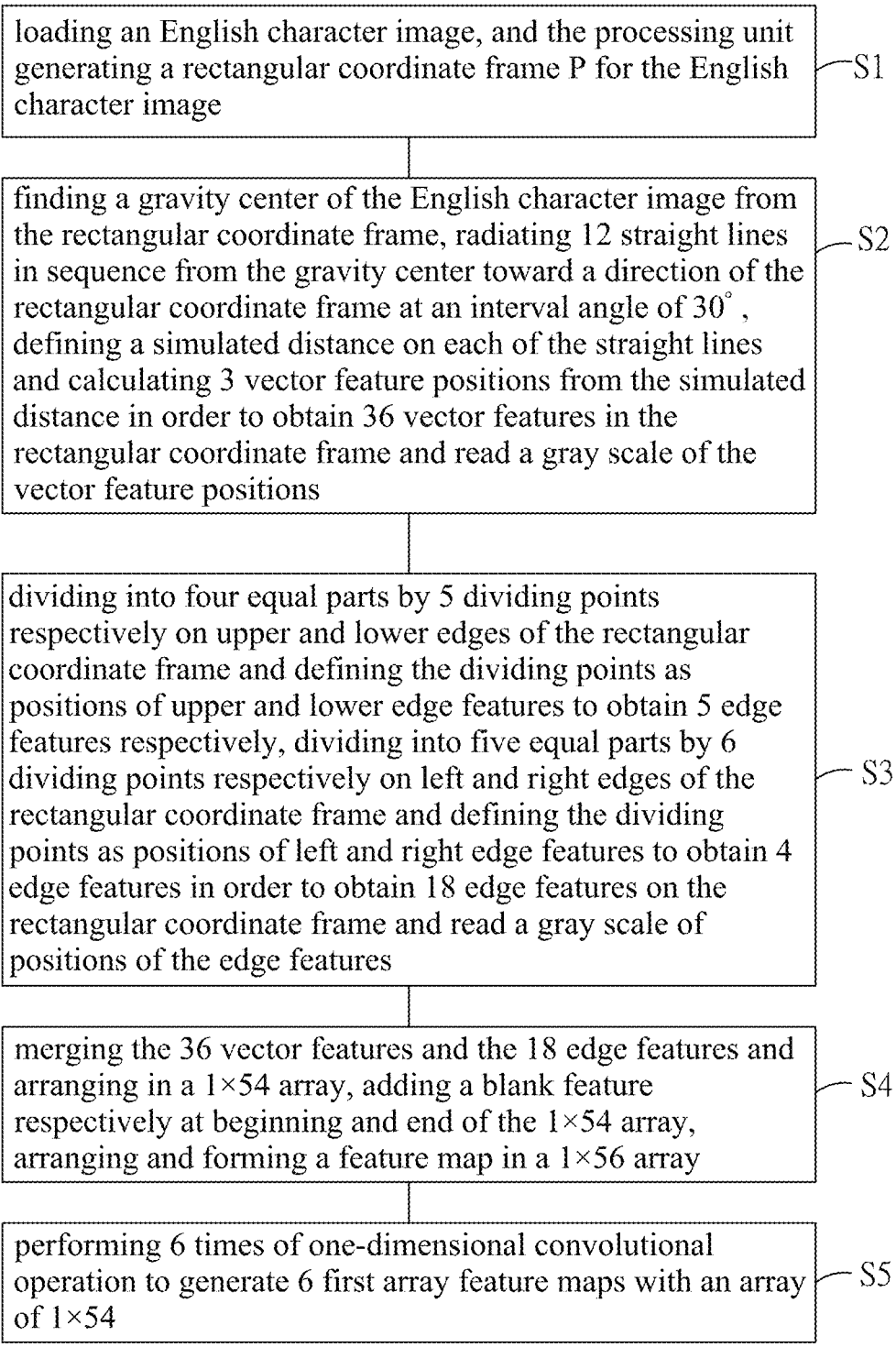
FIG. 1A is a first flow chart of an English char image recognition method of the invention.
Figure 1B:
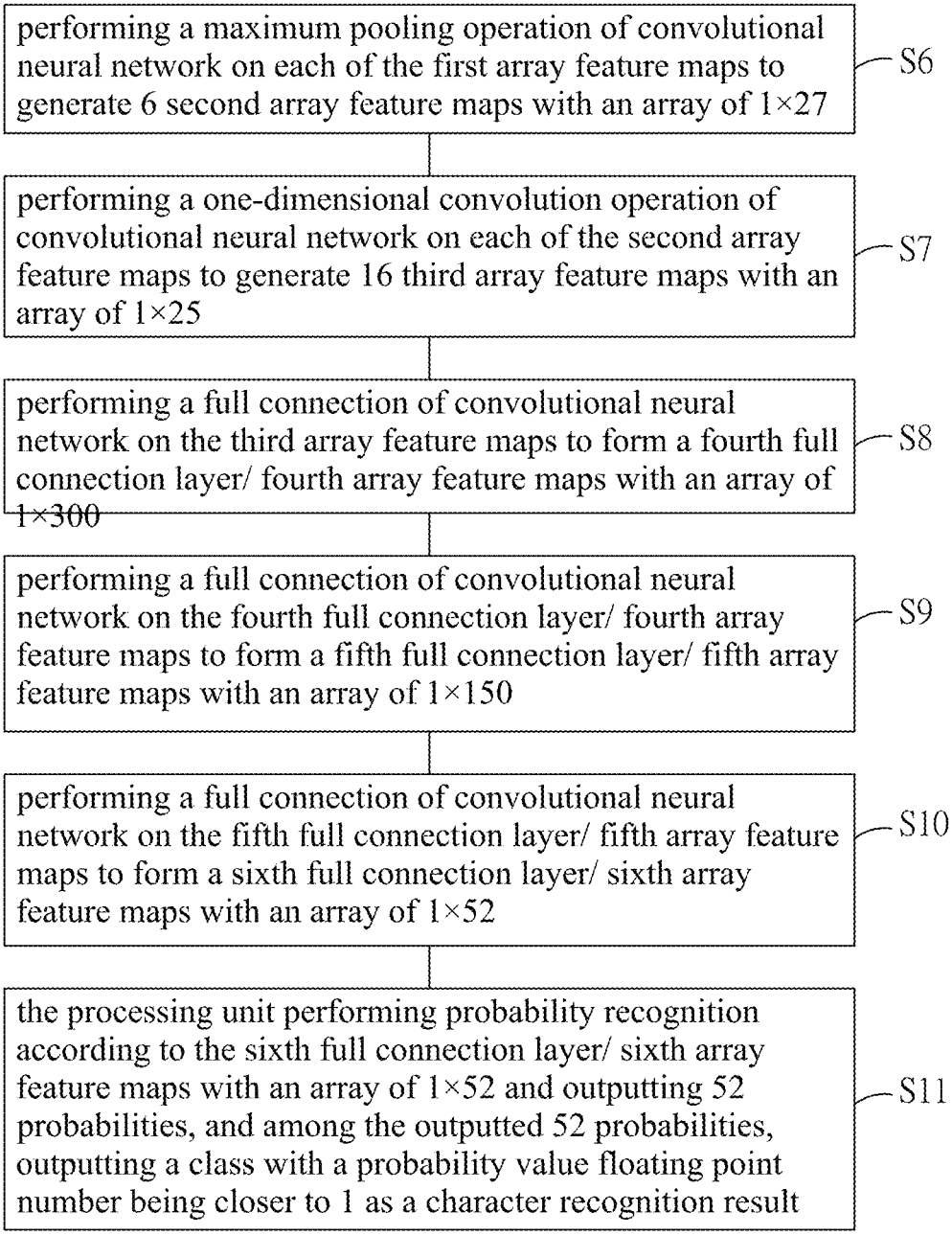
FIG. 1B is a second flow chart of the English char image recognition method of the invention.
Figure 2:
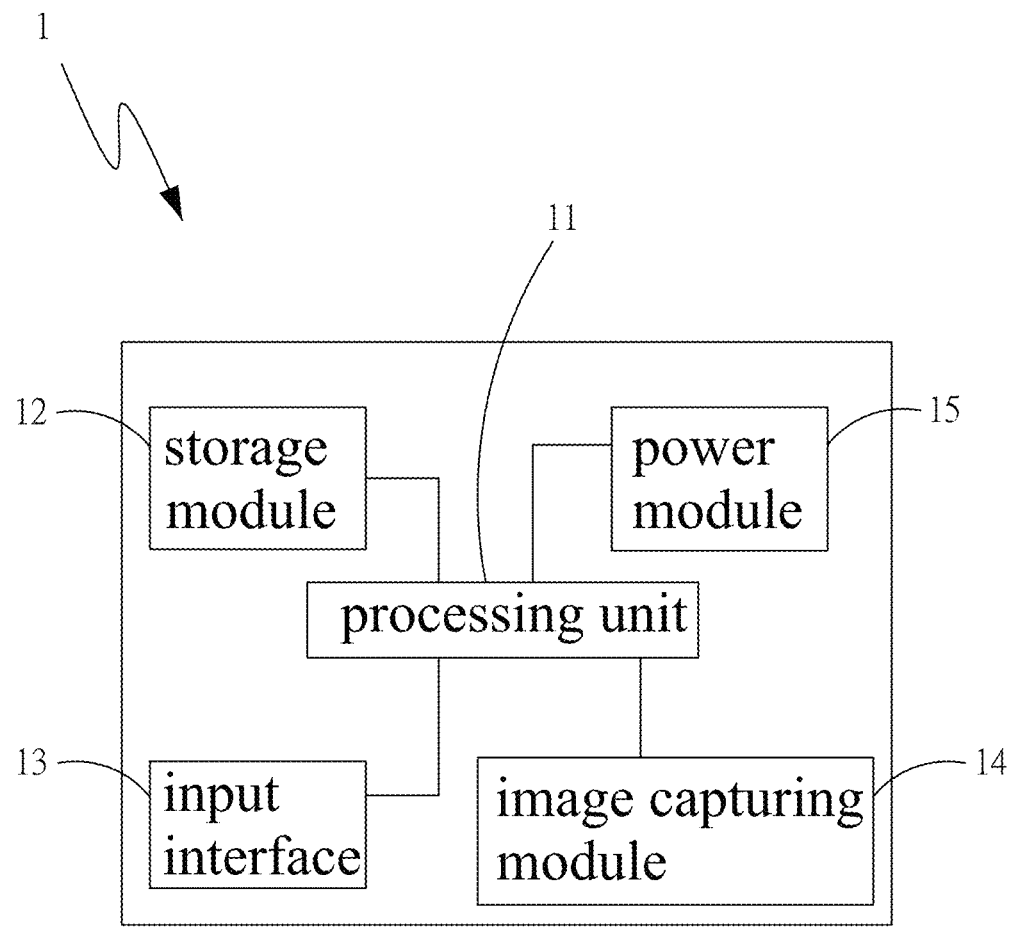
FIG. 2 is a schematic diagram of hardware structure of an electronic device of the invention.

Please refer to FIGS. 1A, 1B and FIG. 2 respectively for flow charts of an English char image recognition method of the invention and a schematic diagram of hardware structure of an electronic device of the English char image recognition method of the invention, wherein the English char image recognition method is mainly applied to an electronic device with computing capabilities, such as desktop computer, notebook computer, mobile phone or tablet. An electronic device 1 of the invention comprises a processing unit 11, a storage module 12, an input interface 13, an image capturing module 14, and a power module 15, wherein the processing unit 11 is electrically connected to the storage module 12, the input interface 13, the image capturing module 14 and the power module 15, wherein the storage module 12 is used to store digital images, the input interface 13 is used to control image capture and image capture operation, the image capturing module 14 is used to take digital images or scan digital images or capture images by means of image reading, and the power module 15 is used to provide the processing unit 11, the storage module 12, the input interface 13 and the image capturing module 14 with operating power, and the English char image recognition method is as follows.

Figure 3:
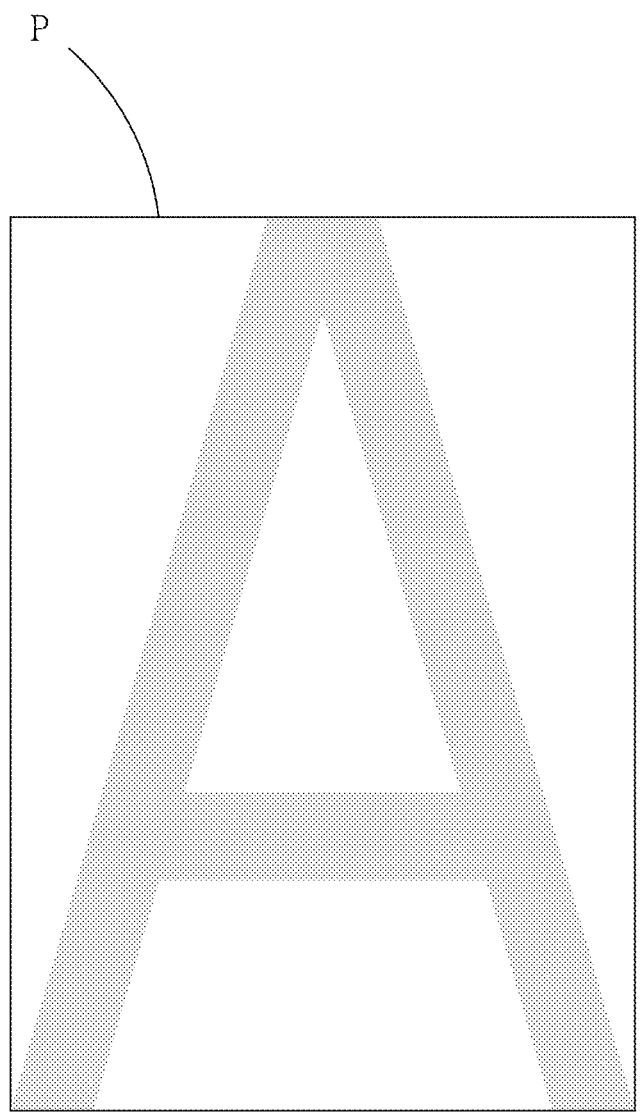
FIG. 3 is a first schematic flow chart of the English char image recognition method of the invention.

Step S1: loading an English character image, and the processing unit generating a rectangular coordinate frame P for the English character image; as shown in FIG. 3, wherein before recognizing the English character image, the image capturing module 14 is used to obtain an image to be recognized, the image capturing module 14 can be a scanner to scan the image to be recognized or use image reading method to obtain the image to be recognized, the processing unit 11 converts the image into a black and white image, the processing unit 11 uses connection method to mark English letters, aggregates black-connected points into the rectangular coordinate frame P, and removes noise of the English letters through a letter filter and combines separated letters such as i and j in English words into one character.

Figure 4:
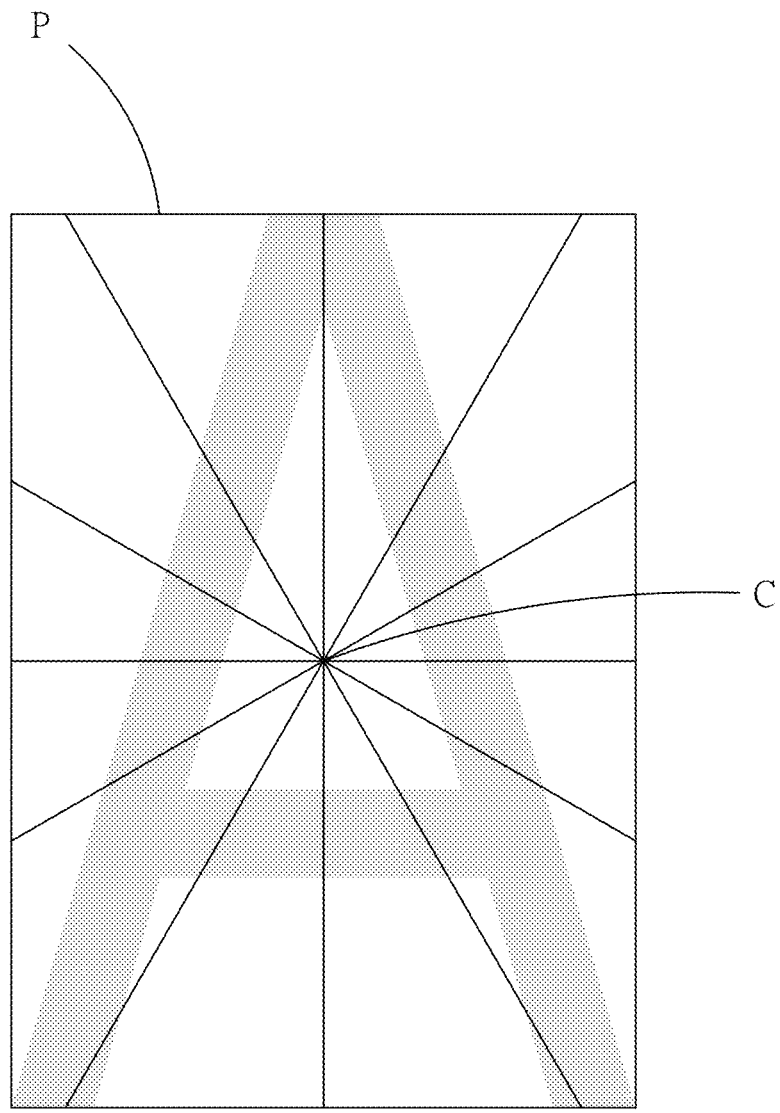
FIG. 4 is a second schematic flow chart of the English char image recognition method of the invention.
Figure 5:
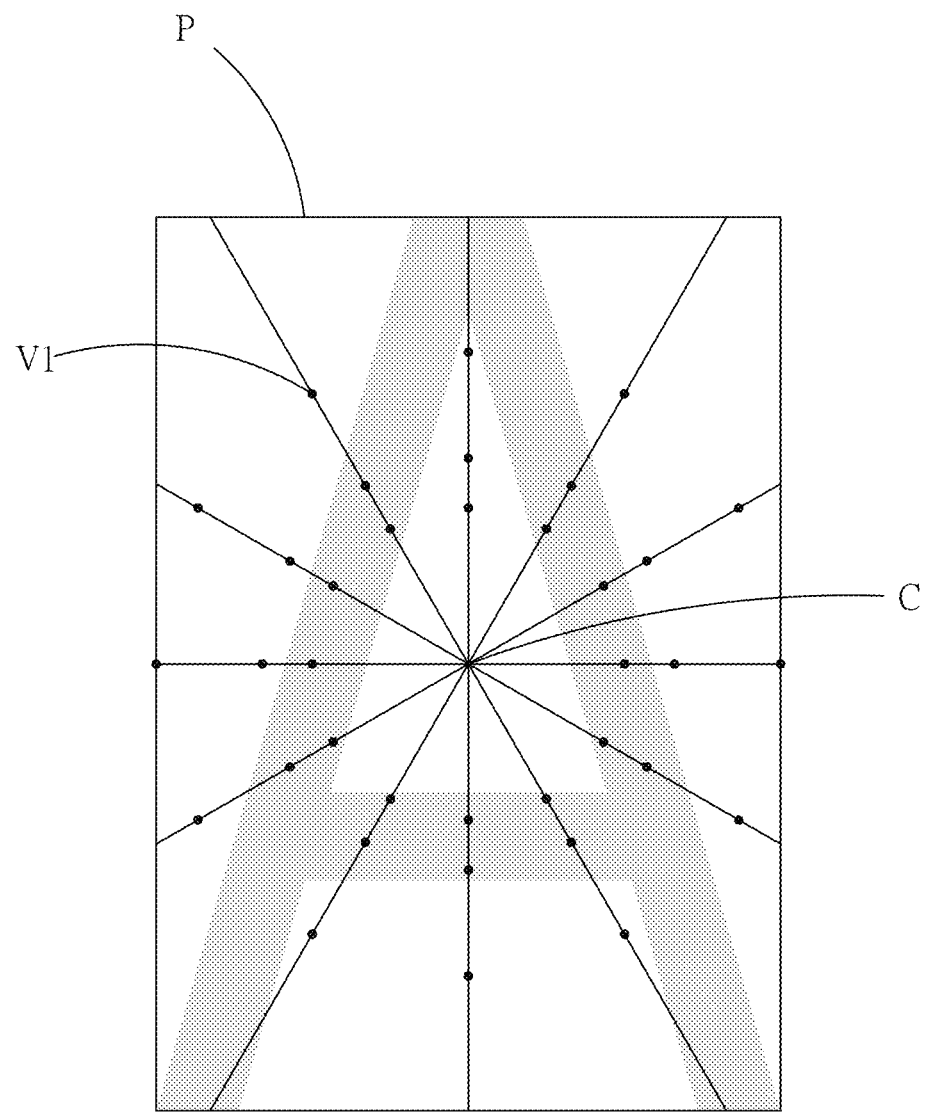
FIG. 5 is a third schematic flow chart of the English char image recognition method of the invention.

Step S2: finding a gravity center of the English character image from the rectangular coordinate frame, radiating 12 straight lines in sequence from the gravity center toward a direction of the rectangular coordinate frame at an interval angle of 30°, defining a simulated distance on each of the straight lines and calculating 3 vector feature positions from the simulated distance in order to obtain 36 vector features in the rectangular coordinate frame and read a gray scale of the vector feature positions; as shown in FIG. 4 and FIG. 5, wherein after the English letters are aggregated into the rectangular coordinate frame P, the processing unit 11 finds a gravity center C of the English character image in the rectangular coordinate frame P, wherein X-axis and Y-axis coordinates of an upper left corner of the rectangular coordinate frame P are defined as (0, 0), a width of the rectangular coordinate frame P is divided by 2 and a rounding process is performed, wherein the rounding process rounds off numbers of digits after the decimal point in a calculation value, and the rounded number is a position of the Y-axis coordinate, then a height of the rectangular coordinate frame P is divided by 2 and a rounding process is performed, wherein the rounding process rounds off numbers of digits after the decimal point in a calculation value, and the rounded number is a position of the X-axis coordinate, and an intersecting position of the Y-axis coordinate position and the X-axis coordinate position is defined as coordinates of the gravity center C.

Wherein after finding the gravity center C of the English character image in the rectangular coordinate frame P, the 12 straight lines are formed in the rectangular coordinate frame P, and the straight lines are formed in a manner that the processing unit 11 radiates the 12 straight lines in a direction of the rectangular coordinate frame P with the gravity center C as a starting point, wherein the first straight line is radiated vertically from the gravity center C upwardly, and the 12 straight lines are obtained by radiating in sequence at an interval angle of 30° from the gravity center C, thereby the 12 straight lines radiated from the gravity center C are formed between the gravity center C and the rectangular coordinate frame P.

Then, a simulated distance is defined on each of the straight lines, and the simulated distance is defined as follows: if a height distance of the rectangular coordinate frame P is greater than a width distance of the rectangular coordinate frame P, a length of the simulated distance is a width distance of the rectangular coordinate frame P, and then through the simulated distance, the 3 vector feature positions are calculated on each of the straight lines, the 3 vector feature positions on each of the straight lines are respectively calculated by dividing the simulated distance from the gravity center C outwardly by 2, dividing the simulated distance from the gravity center C outwardly by 3, and dividing the simulated distance from the gravity center C outwardly by 4, and a rounding process is performed, the rounding process rounds off numbers of digits after the decimal point in a calculation value, and positions of reserved integers are defined as the vector feature positions.

Conversely, if a height distance of the rectangular coordinate frame P is less than a width distance of the rectangular coordinate frame P, a length of the simulated distance is a height distance of the rectangular coordinate frame P, the 3 vector feature positions on each of the straight lines are respectively calculated by dividing the simulated distance from the gravity center C outwardly by 2, dividing the simulated distance from the gravity center C outwardly by 3, and dividing the simulated distance from the gravity center C outwardly by 4, and a rounding process is performed, the rounding process rounds off numbers of digits after the decimal point in a calculation value, and positions of reserved integers are defined as the vector feature positions. Wherein an order in which 36 vector features V1 are obtained is that the first straight line radiating vertically upward from the gravity center C is a starting position, the simulated distance on the straight line is divided by 2 and an integer reserved by the rounding process is the first vector feature position, the simulated distance on the straight line is divided by 3 and an integer reserved by the rounding process is the second vector feature position, and the simulated distance on the straight line is divided by 4 and an integer reserved by the rounding process is the third vector feature position. After the three vector feature positions of the straight line are obtained, the straight line radiated from the gravity center C at an interval angle of 30° is the second obtained position, the simulated distance on the straight line is divided by 2 and an integer reserved by the rounding process is the fourth vector feature position, the simulated distance on the straight line is divided by 3 and an integer reserved by the rounding process is the fifth vector feature position, and the simulated distance on the straight line is divided by 4 and an integer reserved by the rounding process is the sixth vector feature position, and so on. Sequentially from the gravity center C, the straight line radiated at an interval angle of 30° is the next obtained position, and each of the straight lines is divided by 2, divided by 3, and divided by 4, and integers reserved by the rounding process are the vector feature positions arranged in sequence. Thereby, the 36 vector features V1 are obtained in the rectangular coordinate frame P through the straight line of the simulated distance, wherein the 36 vector features V1 are obtained by reading a gray scale of their vector feature positions.

Figure 6:
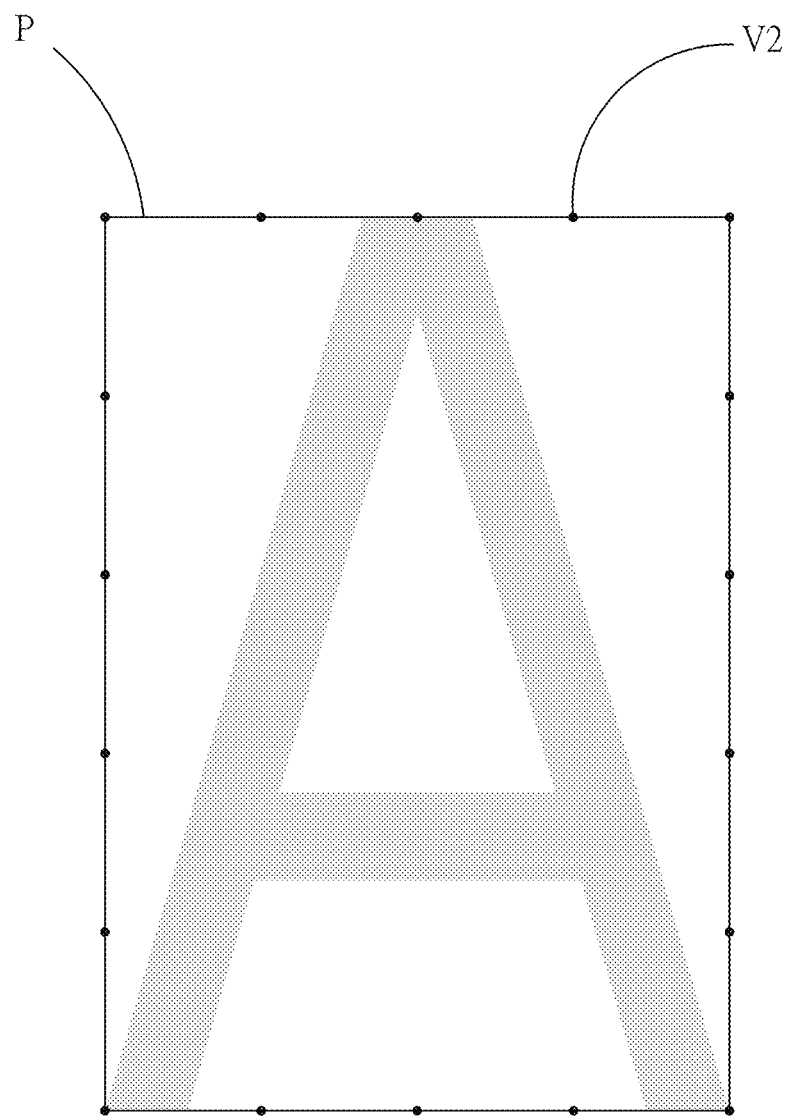
FIG. 6 is a fourth schematic flow chart of the English char image recognition method of the invention.

Step S3: dividing into four equal parts by 5 dividing points respectively on upper and lower edges of the rectangular coordinate frame and defining the dividing points as positions of upper and lower edge features to obtain 5 edge features respectively, dividing into five equal parts by 6 dividing points respectively on left and right edges of the rectangular coordinate frame and defining the dividing points as positions of left and right edge features to obtain 4 edge features in order to obtain 18 edge features on the rectangular coordinate frame and read a gray scale of positions of the edge features; as shown in FIG. 6, after obtaining the 36 vector features V1 in the rectangular coordinate frame P, edge features V2 are obtained around the rectangular coordinate frame P, and a method of obtaining edge feature positions is: first dividing an upper edge of the rectangular coordinate frame P into four equal parts, defining a dividing point at an upper left corner of the rectangular coordinate frame P as a first edge feature position, and then defining a dividing point towards the right of the rectangular coordinate frame P as a second edge feature position, so the 5 upper dividing points are defined as positions of the 5 edge features V2, and then dividing a lower edge of the rectangular coordinate frame P into four equal parts, first defining a dividing point at a lower left corner of the rectangular coordinate frame P as a sixth edge feature position, and then defining a dividing point towards the right of the rectangular coordinate frame P as a seventh edge feature position, so the 5 lower dividing points are defined as positions of the 5 edge features V2, so an upper edge and a lower edge of the rectangular coordinate frame P have the first to tenth edge features V2, wherein the first edge feature V2 and the fifth edge feature V2 are located at the upper left corner and the upper right corner of the rectangular coordinate frame P, respectively, and the sixth edge feature V2 and the tenth edge feature V2 on the lower edge are located at the lower left corner and the lower right corner of the rectangular coordinate frame P, respectively.

Then, the left side of the rectangular coordinate frame P is divided into five equal parts, but the dividing point at the top left overlaps with the position of the first edge feature on the upper edge, and the overlapping dividing points are not repeatedly defined, so the dividing point below the upper left corner is defined as the position of the eleventh edge feature, the dividing points in sequence downwardly are defined as the positions of the 12th, 13th, and 14th edge features, but the dividing point at the bottom left overlaps with the position of the 6th edge feature at the lower left corner, and the overlapping dividing points are not repeatedly defined, and then the right side of the rectangular coordinate frame P is divided into five equal parts, but the dividing point at the top right overlaps with the position of the fifth edge feature on the upper edge, and the overlapping dividing points are not repeatedly defined, so the dividing point below the upper right corner is defined as the position of the 15th edge feature, the dividing points in sequence downwardly are defined as the positions of the 16th, 17th, and 18th edge features, but the dividing point at the bottom right overlaps with the position of the 10th edge feature at the lower right corner, and the overlapping dividing points are not repeatedly defined. Therefore, the 18 edge features V2 are obtained on the rectangular coordinate frame P and a gray scale of the positions of the edge features is read.

Figure 7:
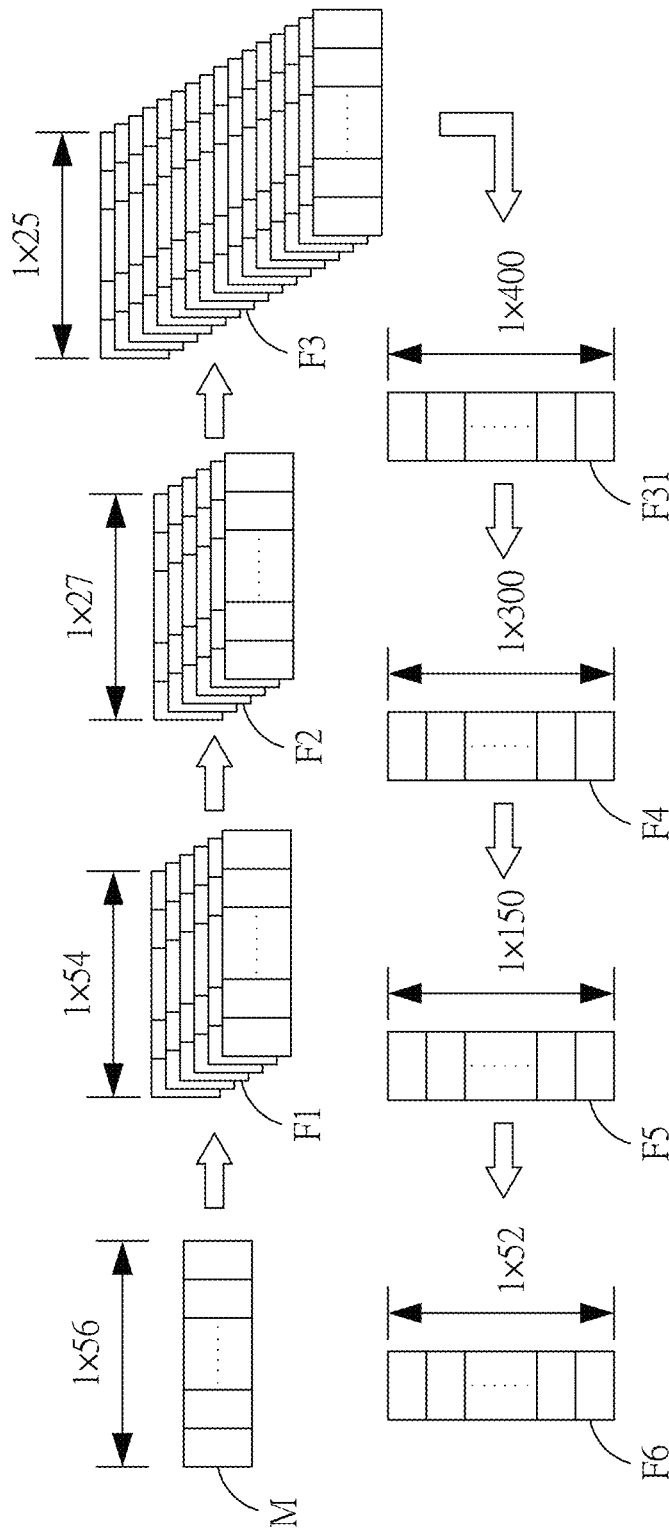
FIG. 7 is a fifth schematic flow chart of the English char image recognition method of the invention.

Step S4: merging the 36 vector features and the 18 edge features and arranging in a 1×54 array, adding a blank feature respectively at beginning and end of the 1×54 array, arranging and forming a feature map in a 1×56 array; as shown in FIG. 7, wherein the processing unit 11 obtains the 36 vector features V1 in the rectangular coordinate frame P and the 18 edge features V2 on the rectangular coordinate frame P, and then arranges the 36 vector features V1 and the 18 edge features V2 in sequence and merges them into 54 features, and arranges the 54 features in a 1×54 array, after the array is arranged, a blank feature with a gray scale of 255 is added to the beginning and the end of the 1×54 array to form a 1×56 array, and the 1×56 array is defined as a feature map, adding a blank feature with a gray scale of 255 at the beginning and the end is mainly to avoid shortening data during convolutional neural network.

Step S5: performing 6 times of one-dimensional convolutional operation to generate 6 first array feature maps with an array of 1×54; wherein after a feature map M with an array of 1×56 is formed, the processing unit 11 reads the feature map M of the 1×56 array, the processing unit 11 performs a one-dimensional convolutional operation on the feature map M of the 1×56 array, and the processing unit 11 uses random values and an array of 1×3 core to perform 6 times of one-dimensional convolutional operation, after the operation is completed, 6 first array feature maps F1 with an array of 1×54 are generated.

Step S6: performing a maximum pooling operation of convolutional neural network on each of the first array feature maps to generate 6 second array feature maps with an array of 1×27; wherein after the 6 first array feature maps F1 with an array of 1×54 are generated, the processing unit 11 performs a maximum pooling operation of convolutional neural network on the 6 first array feature maps F1 with an array of 1×54, and the processing unit 11 uses an array of 1×2 core to perform the maximum pooling operation, after the operation is completed, 6 second array feature maps F2 with an array of 1×27 are generated.

Step S7: performing a one-dimensional convolution operation of convolutional neural network on each of the second array feature maps to generate 16 third array feature maps with an array of 1×25; wherein after the 6 second array feature maps F2 with an array of 1×27 are generated, the processing unit 11 performs a one-dimensional convolution operation of second convolutional neural network on the 6 second array feature maps F2 with an array of 1×27, the processing unit 11 uses random values and an array of 1×3 core to perform the one-dimensional convolutional operation, when the 6 second array feature maps F2 with an array of 1×27 and the core with an array of 1×3 are operated, 18 feature maps are normally obtained, but in this embodiment, the processing unit 11 only obtains 16 feature maps after operating in sequence, so the processing unit 11 generates 16 third array feature maps F3 with an array of 1×25 after the operation is completed.

Step S8: performing a full connection of convolutional neural network on the third array feature maps to form a fourth full connection layer/fourth array feature maps with an array of 1×300; wherein after the 16 third array feature maps F3 with an array of 1×25 are generated, the processing unit 11 performs a convolutional neural network flattening process on the 16 third array feature maps F3 with an array of 1×25, so the processing unit 11 generates a fully connection layer F31 with an array of 1×400, after the fully connection layer F31 with an array of 1×400 is generated by the processing unit 11, the processing unit 11 performs a full connection of convolutional neural network on the fully connection layer F31 with an array of 1×400, so the processing unit 11 generates a fourth full connection layer/fourth array feature maps F4 with an array of 1×300.

Step S9: performing a full connection of convolutional neural network on the fourth full connection layer/fourth array feature maps F4 to form a fifth full connection layer/fifth array feature maps with an array of 1×150; wherein after the fourth full connection layer/fourth array feature maps F4 with an array of 1×300 is generated, the processing unit 11 performs a full connection of second convolutional neural network on the fourth full connection layer/fourth array feature maps F4 with an array of 1×300, so the processing unit 11 generates a fifth full connection layer/fifth array feature maps F5 with an array of 1×150.

Step S10: performing a full connection of convolutional neural network on the fifth full connection layer/fifth array feature maps F5 to form a sixth full connection layer/sixth array feature maps with an array of 1×52; wherein after the fifth full connection layer/fifth array feature maps F5 with an array of 1×150 is generated, the processing unit 11 performs a full connection of third convolutional neural network on the fifth full connection layer/fifth array feature maps F5 with an array of 1×150, so the processing unit 11 generates a sixth full connection layer/sixth array feature maps F6 with an array of 1×52.

Step S11: the processing unit performing probability recognition according to the sixth full connection layer/sixth array feature maps F6 with an array of 1×52 and outputting 52 probabilities, and among the outputted 52 probabilities, outputting a class with a probability value floating point number being closer to 1 as a recognition result; wherein after the processing unit 11 generates the sixth full connection layer/sixth array feature maps F6 with an array of 1×52, the processing unit 11 performs probability recognition according to the sixth full connection layer/sixth array feature maps F6, the processing unit 11 first defines classes 0-25 as 26 uppercase English letters from A to Z, and defines classes 26-51 as 26 lowercase English letters from a to z, the processing unit 11 sequentially determines each value in the sixth full connection layer/sixth array feature maps F6 for probability recognition, and among the outputted 52 probabilities, the closer a probability value floating point number is to 1, the higher a probability of the class, the class is then output as a character recognition result, wherein character coordinates and character results output by the processing unit 11 are arranged in an order of coordinates from left to right and from top to bottom, thereby the English char image recognition method of the invention is capable of solving the problem of generating a large amount of computation in conventional two-dimensional recognition operation, and thus achieving an efficacy of reducing recognition equipment costs and enabling fast and accurate recognition by using one-dimensional recognition operation.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. An English char image recognition method applied to an electronic device with computing capabilities, the electronic device comprising a processing unit, the English char image recognition method at least comprising steps of:
   loading an English character image, generating a rectangular coordinate frame for the English character image by the processing unit;
   finding a gravity center of the English character image in the rectangular coordinate frame, radiating 12 straight lines in sequence from the gravity center toward a direction of the rectangular coordinate frame at an interval angle of 30°, defining a simulated distance on each of the straight lines and calculating 3 vector feature positions from the simulated distance in order to obtain 36 vector features in the rectangular coordinate frame and read a gray scale of the vector feature positions;
   dividing into four equal parts by 5 dividing points respectively on upper and lower edges of the rectangular coordinate frame and defining the dividing points as positions of upper and lower edge features to obtain 5 edge features respectively, dividing into five equal parts by 6 dividing points respectively on left and right edges of the rectangular coordinate frame and defining the dividing points as positions of left and right edge features to obtain 4 edge features in order to obtain 18 edge features on the rectangular coordinate frame and read a gray scale of positions of the edge features;
   merging 36 vector features and 18 edge features and arranging in a 1×54 array, adding a blank feature respectively at beginning and end of the 1×54 array, arranging and forming a feature map in a 1×56 array;
   performing 6 times of one-dimensional convolutional operation to generate 6 first array feature maps with an array of 1×54;
   performing a maximum pooling operation of convolutional neural network on each of the first array feature maps to generate 6 second array feature maps with an array of 1×27;
   performing a one-dimensional convolution operation of convolutional neural network on each of the second array feature maps to generate 16 third array feature maps with an array of 1×25;
   performing a full connection of convolutional neural network on the third array feature maps to form a fourth full connection layer/fourth array feature maps with an array of 1×300;
   performing a full connection of convolutional neural network on the fourth full connection layer/fourth array feature maps to form a fifth full connection layer/fifth array feature maps with an array of 1×150;
   performing a full connection of convolutional neural network on the fifth full connection layer/fifth array feature maps to form a sixth full connection layer/sixth array feature maps with an array of 1×52; and
   the processing unit performing probability recognition according to the sixth full connection layer/sixth array feature maps with an array of 1×52 and outputting 52 probabilities, and among the outputted 52 probabilities, outputting a class with a probability value floating point number being closer to 1 as a character recognition result.

2. The English char image recognition method as claimed in claim 1, wherein a width of the rectangular coordinate frame is divided by 2 and a height thereof is divided by 2 and a rounding process is performed, the rounding process rounds off numbers of digits after the decimal point in a calculation value, an intersecting position of the numbers after the width and height are rounded off is defined as the gravity center, the first straight line is radiated vertically from the gravity center toward an upper direction of the rectangular coordinate frame, and the 12 straight lines are obtained by radiating in sequence at an interval angle of 30° from the gravity center.

3. The English char image recognition method as claimed in claim 2, wherein if a height distance of the rectangular coordinate frame is greater than a width distance of the rectangular coordinate frame, a length of the simulated distance is a width distance of the rectangular coordinate frame, the 3 vector feature positions on each of the straight lines are respectively calculated by dividing the simulated distance from the gravity center outwardly by 2, dividing the simulated distance from the gravity center outwardly by 3, and dividing the simulated distance from the gravity center outwardly by 4, and a rounding process is performed, the rounding process rounds off numbers of digits after the decimal point in a calculation value, and positions of reserved integers are defined as the vector feature positions, conversely, if a height distance of the rectangular coordinate frame is less than a width distance of the rectangular coordinate frame, a length of the simulated distance is a height distance of the rectangular coordinate frame, the 3 vector feature positions on each of the straight lines are respectively calculated by dividing the simulated distance from the gravity center outwardly by 2, dividing the simulated distance from the gravity center outwardly by 3, and dividing the simulated distance from the gravity center outwardly by 4, and a rounding process is performed, the rounding process rounds off numbers of digits after the decimal point in a calculation value, and positions of reserved integers are defined as the vector feature positions.

4. The English char image recognition method as claimed in claim 1, wherein the processing unit uses random values and an array of 1×3 core to perform 6 times of one-dimensional convolutional operation to generate 6 first array feature maps with an array of 1×54.

5. The English char image recognition method as claimed in claim 1, wherein the processing unit uses an array of 1×2 core to perform a maximum pooling operation of convolutional neural network on the 6 first array feature maps with an array of 1×54 to generate 6 second array feature maps with an array of 1×27.

6. The English char image recognition method as claimed in claim 1, wherein the processing unit uses random values and an array of 1×3 core to perform a one-dimensional convolutional operation on the 6 second array feature maps with an array of 1×27 to generate 16 third array feature maps with an array of 1×25.

7. The English char image recognition method as claimed in claim 6, wherein the processing unit flattens the 16 third array feature maps with an array of 1×25 and generates a fully connection layer with an array of 1×400, and the processing unit performs full connection of a first convolutional neural network on the fully connection layer with an array of 1×400 to generate a fourth full connection layer/fourth array feature maps with an array of 1×300.

8. The English char image recognition method as claimed in claim 7, wherein the processing unit performs full connection of a second convolutional neural network on the fourth full connection layer/fourth array feature maps with an array of 1×300 to generate a fifth full connection layer/fifth array feature maps with an array of 1×150.

9. The English char image recognition method as claimed in claim 8, wherein the processing unit performs full connection of a third convolutional neural network on the fifth full connection layer/fifth array feature maps with an array of 1×150 to generate a sixth full connection layer/sixth array feature maps with an array of 1×52, and the processing unit recognizes the sixth full connection layer/sixth array feature maps with an array of 1×52 and generates the character recognition result.

* * * * *